US006666085B1

(12) United States Patent
Lowe

(10) Patent No.: US 6,666,085 B1
(45) Date of Patent: Dec. 23, 2003

(54) LIQUID LEVEL SENSOR

(76) Inventor: Jerry Watson Lowe, R.R. 2 Box 132, Albany, KY (US) 42602

( * ) Notice: Subject to any disclaimer, the term of this patent is extended or adjusted under 35 U.S.C. 154(b) by 0 days.

(21) Appl. No.: 10/233,097

(22) Filed: Aug. 28, 2002

(51) Int. Cl.[7] .............................................. G01F 23/00
(52) U.S. Cl. ........................ 73/299; 73/290 R; 73/302
(58) Field of Search ........................... 73/290 R, 299, 73/302

(56) References Cited

U.S. PATENT DOCUMENTS

| | | | |
|---|---|---|---|
| 3,935,741 A | | 2/1976 | Zinsmeyer |
| 4,368,639 A | * | 1/1983 | Owens .......................... 73/301 |
| 4,627,281 A | * | 12/1986 | Tavis ............................ 73/302 |
| 4,862,734 A | * | 9/1989 | Elderton ...................... 73/49.2 |
| 5,069,068 A | | 12/1991 | Jacob |
| 5,163,324 A | * | 11/1992 | Stewart ......................... 73/302 |
| 5,747,689 A | | 5/1998 | Hampo |

OTHER PUBLICATIONS

Bill Lucas Motorola Application Note AN 1315 1997.
JC Hamelain Motorola Application Note AN 1516 1997.

* cited by examiner

*Primary Examiner*—Hezron Williams
*Assistant Examiner*—Rodney Frank

(57) ABSTRACT

A liquid-level measuring device measures the liquid level in a tank. This invention measures liquid level by measuring the pressure at the bottom of the tank. A pressure sensor is placed in the top sealed end of a pipe extending from above the top of the tank down to and open into the bottom of the tank. When the tank is empty the pressure is zero (relative to atmospheric pressure). As the liquid level of the tank rises from empty to full, the pressure rises according to the weight of the liquid. An electronic pressure sensor is used to measure the pressure. The output of the pressure sensor is amplified and sent to an operator display device.

2 Claims, 4 Drawing Sheets

LIQUID LEVEL SENSOR

CROSS-REFERENCE TO RELATED APPLICATIONS

Not applicable

FEDERALLY SPONSORED RESEARCH

Not applicable

SEQUENCE LISTING OR PROGRAM

Not applicable

BACKGROUND OF INVENTION

1. Field of Invention

This invention generally pertains to measuring the liquid level in a liquid holding tank, and, more specifically an accurate and dependable device to give continuous, empty to full readings.

2. Prior Art

U.S. Patent Documents found:

U.S. Pat. No. 5,747,689 issued May 1998 to Hampo, Momcilovich and Ross for fluid level sensing system.

U.S. Pat. No. 5,069,068 issued December 1991 to Jacob and Zawadzki for a fluid level maintenance sensor for use in a tank test system.

U.S. Pat. No. 3,935,741 issued February 1976 to Zinsmeyer, Johnson and Genz for level sensor.

Description of Related Art:

Liquid holding tanks are used for fuel, fresh water, sewage and other liquids on vehicles, recreational vehicles, boats, trains, buses, and aircrafts. Stationary holding tanks, above ground or underground hold various types of liquid. The level of liquid in all of these tanks must be constantly monitored to avoid running empty, running over or to determine needed service. Level-sensing devices currently have varying degrees of success.

Some level-sensing devices use floats that in turn operate rheostats, micro-switches, optical devices or magnetic switches. Others use electrical probes to detect a change in resistance as the amount of liquid changes in the tank. These devices require some type of electrical devices, probes, moving rods or other objects be placed in the liquid. Some liquids have a degrading effect on these devices causing malfunction over a period of time. Another device measures the temperature in a vertical arrangement on the outside of the tank. This method is only practical in cases where the liquid is a different temperature than the ambient air. Another method weighs the tank and compares the empty weight to the present weight of the tank. This method requires scales of some type or load cells if a reading at a remote location is needed. These devices are costly.

OBJECTS AND ADVANTAGES

This invention uses the weighing of the liquid in the holding tank as a way to measure the level without weighing the tank. Instead, it weighs the liquid at or near the bottom of the tank using a differential pressure sensor. When the tank is empty, the pressure is zero compared to atmospheric pressure. As the tank is filled an accurate level measurement is made. In the water and sewage holding application one cubic inch of water weighs 0.036125 lbs. and produces the same pounds per square inch of pressure on the pressure sensor. Other liquids have varying weights and provide a corresponding amount of pressure. The pressure sensor, in turn, produces DC voltage corresponding to the pressure applied. The voltage is amplified and sent to a monitoring device such as a meter or other display device. A calibrated meter scale or display device indicates units and/or the percent of full tank capacity. This information allows the operator to plan for service.

DRAWINGS

Figure 1:
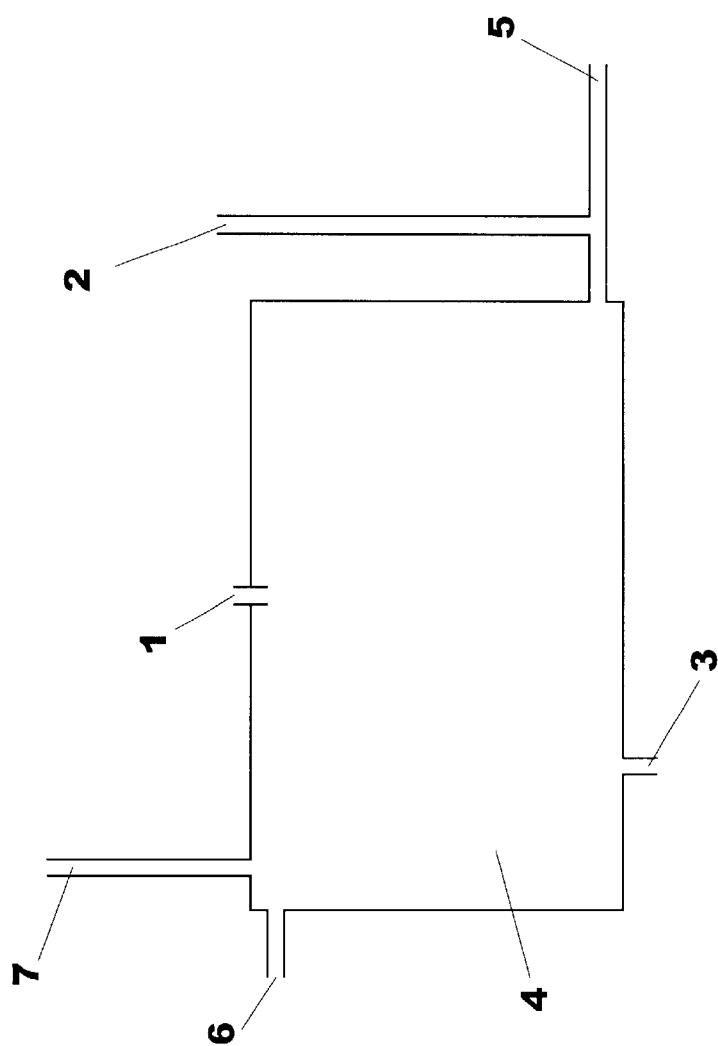
FIG. 1 is a cut away view of a typical holding tank with all components numbered.
Figure 2:
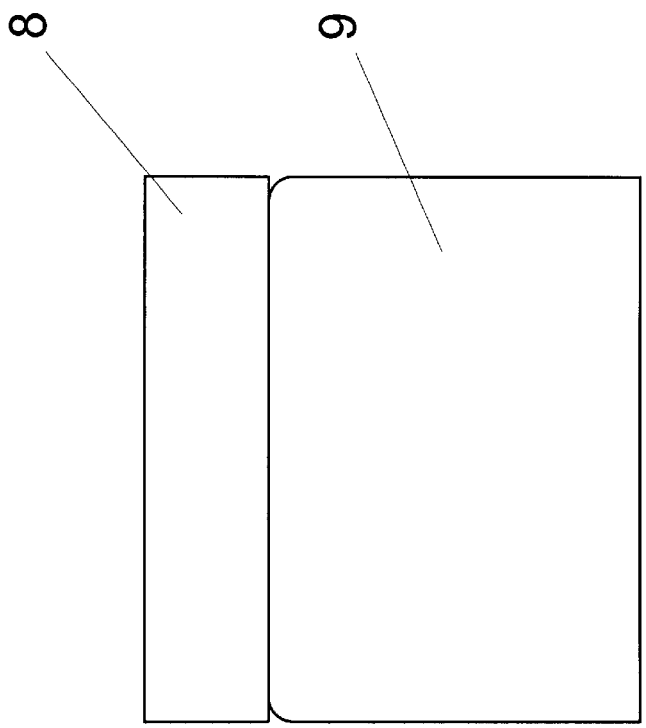
FIG. 2 is a side view of a PVC pipe cap and sensor box.
Figure 3:
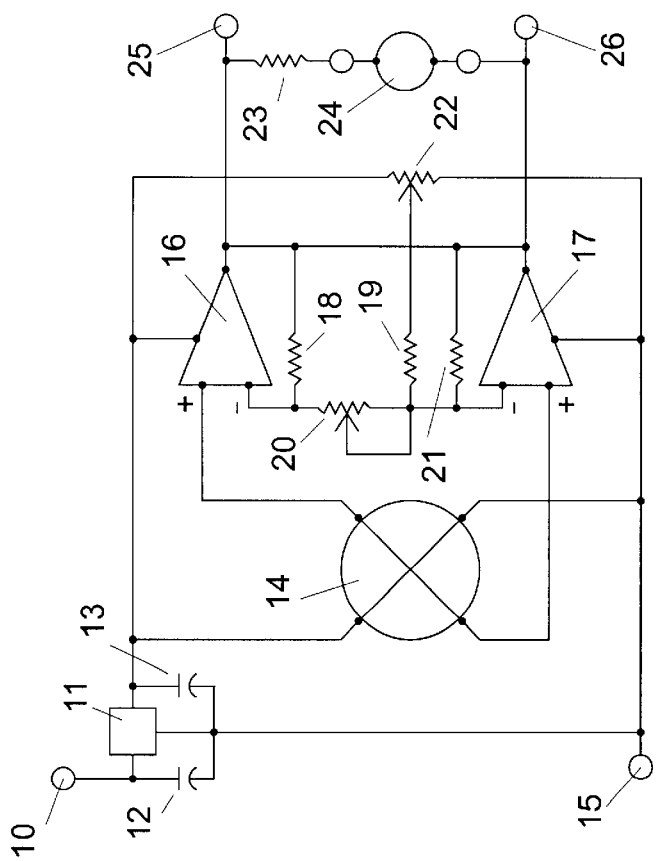
FIG. 3 is a schematic of the sensor and amplifier.
Figure 4:
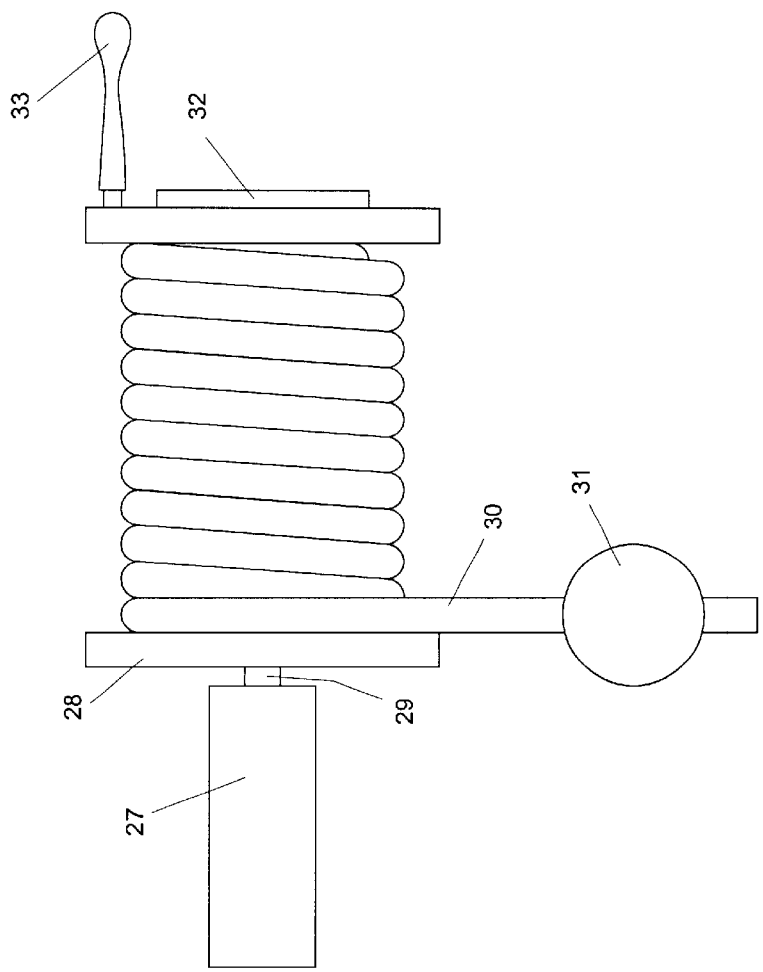
FIG. 4 is a drawing of additional embodiment device.

FIG. 1 Reference Numbers
1 location
2 location
3 location
4 tank
5 drain
6 inlet
7 vent FIG. 2 Reference Numbers
8 sensor box
9 1½-inch PVC cap FIG. 3 Reference Numbers
10 14-volt source
11 regulator
12 capacitor
13 capacitor
14 pressure sensor
15 common
16 operational amplifier
17 operational amplifier
18 resistor
19 resistor
20 potentiometer
21 resistor
22 potentiometer
23 resistor
24 one-milliamp meter
25 differential positive
26 differential negative FIG. 4 Reference Numbers
27 handle
28 spool
29 spool center shaft
30 hose
31 weight
32 indicator
33 crank

SUMMMARY

Referring to FIG. 1:

A typical holding tank, tank 4, is shown as a cut away side view. Tank 4 has an inlet 6, a vent 7 and Locations for attaching a pressure sensor to holding tank 4 are identified as location 1, location location 3. While location 3 (some place through the bottom of the tank) would be a good it would also expose the sensor to the liquid. This would create a service problem if the needed to be replaced. Location 1 and location 2 eliminates this problem because there is a column of air between the liquid and the pressure sensor.

Location 1 (someplace through the top of the tank and extending down to near the bottom of the tank) would be better. Location 1 has a drawback of allowing the moving liquid to put side force on the bottom of the pipe inserted into the tank. Location 2, a standpipe on the outside of the tank and open into the tank near the bottom, would eliminate this possibility. The trapped column of air using location 1 or location 2 would keep the sensor dry. Three locations are described to show how pressure sensing could be used in several ways and obtain a similar result.

DETAILED DESCRIPTION

Description of the Preferred Embodiment

Referring to FIG. 1: Location 2 was chosen for the Preferred Embodiment.

Referring to FIG. 2:

Sensor box 8 is a box containing the sensor and amplifier, mounted on the top flat surface of 1½-inch PVC cap 9. The 1½-inch PVC cap 9 has four holes through the top flat surface. Three tapped 6-32 holes for mounting the sensor box 8 and one larger hole between two of the mounting holes. The larger hole is ¼ inch diameter for clearance of the sensor pressure port. The sensor is mounted on a printed circuit board containing an amplifier and an electrical connector. The assembly is then installed in the sensor box 8 and attached to the top of 1½- inch PVC cap 9 with 6-32 stainless steel screws.

The sensor pressure tube extends through the ¼-inch hole and into the inside of 1½-inch PVC cap 9. The base of the sensor is sealed to the top of 1½-inch PVC cap 9 preventing air from escaping. This assembly can be glued to the top of a PVC standpipe FIG. 1, location 2. It may also be glued onto a PVC pipe extending down into FIG. 1, tank 4, at location 1.

Sensor and Electronics

Referring to FIG. 3:

All components of FIG. 3, except the one-milliamp meter 24 are mounted on a printed circuit board.

DC voltage is connected to the sensor-amplifier with the positive lead connected to 14-volt source 10 and the negative lead to common 15. Capacitor 12, a 1.5 uf @ 35-volt tantalum capacitor, is used to reduce line impedance for regulator 11. Capacitor 13, a 1.5 uf @ 20-volt tantalum capacitor, is used to stabilize regulator 11. Regulator 11 is a low power plastic case eight-volt positive regulator.

Pressure sensor 14 is a silicon pressure sensor with a range of 0 to 1.45 pounds per square inch. This range allows for a range of 0 to 40 inches of water column. The full range differential output voltage of pressure sensor 14 is 0 to 0.025. Pressure sensor 14 is connected to the eight-volt positive source from regulator 11 and common 15 for power.

The differential outputs of pressure sensor 14 are connected to the positive inputs of operational amplifier 16 and operational amplifier 17. The positive output of pressure sensor 14 is connected to operational amplifier 16 and the negative output to operational amplifier 17. Resistor 18 and resistor 21 provide negative feedback for operational amplifier 16 and operational amplifier 17, respectfully. Each of these resistors are 100,000-ohms. Potentiometer 20 has 10,000 ohms of resistance and is the gain control for operational amplifier 16 and operational amplifier 17. By reducing the resistance of potentiometer 20 the gain is increased. Potentiometer 20 is adjusted for a full-scale reading when FIG. 1, tank 4 is full. Potentiometer 22 has 100,000-ohms resistance and is the offset adjustment to adjust for meter zero when the FIG. 1 tank 4 is empty. Resistor 19 is a 100,000-ohm resistor that connects the wiper of potentiometer 22 to the negative input of operational amplifier 17.

Differential positive 25 is the positive output and differential negative 26 is the negative output. These two outputs drive remote-mounted one-milliamp meter 24 through 4,700-ohm resistor 23. Differential positive 25 and negative 26 outputs are provided. These outputs may be used to drive differential devices, e.g., an A/D input board in a computer.

Description of the Additional Embodiment

The pressure sensor and electronics of the preferred embodiment are used as a portable device. A hand-held battery-powered device containing the pressure sensor and electronics is used to make temporary tank measurements. Small rubber or plastic hose is attached to the pressure sensor with the other end open and weighted so it will sink to the bottom of a tank.

The pressure sensor and hose would be selected for the type liquid and the height of the tank. Full tank capacity calibration would also be set for these parameters.

Referring to FIG. 4:

Handle 27 is a round tubular part used by an operator to hold the portable device. Spool 28 is a spool that holds hose 30 and has a center shaft 29 that rotates inside handle 27. The other end of spool 28 contains indicator 32. The pressure sensor in indicator 32 is attached to hose 30 inside spool 28. Indicator 32 consists of the pressure sensor, electronics, meter and a battery. Weight 31 is a weight attached to the end of hose 30 to make it sink into the liquid. Crank 33 is used to wind hose 30 back onto spool 28 after the reading is made.

Conclusions

While the preferred embodiment is for water-based liquids and uses PVC for plumbing, other liquids may require other materials.

This invention overcomes the limitations of previous tank gauges by providing an accurate means of measuring the liquid level of a tank. Using the standpipe method at location 2 of FIG. 1 provides a liquid level measurement without inserting any object into the liquid. When using location 1 of FIG. 1 only a PVC pipe is inserted into the liquid and PVC is designed to handle water and sewage. Location 3 of FIG. 1 could be used by attaching pipe or tubing from this location to the sensor located above tank 4. This would keep the sensor dry but may allow settlement to clog the sensor plumbing.

While the Preferred Embodiment, describes specific parts and devices, other parts and devices could be used with the same or similar results. For example, different materials, types and size plumbing parts could be used. The glue on PVC cap could be a threaded pipe cap or a pipe plug. Plumbing reducers and adapters could be used if the application required. While this sensor is mounted on top of a PVC cap, the sensor could be at another location and use small tubing to connect it to the top of the pipe. Small tubing from the sensor could be dropped into the tank and eliminate the PVC plumbing parts used in the Preferred Embodiment. However, this small tubing may be easily clogged by tank settlements.

The 0 to 1.45 psi silicon sensor was selected for the Preferred Embodiment, other pressure ranges can be used, e.g. for tanks more than 40-inches tall. Even different types of pressure sensors could be used. While the Preferred Embodiment uses a one-milliamp analog meter, with slight modification(s) a different meter rating could be used. The differential amplifier used in the Preferred Embodiment could have output stages for single ended output with reference to common (ground). Even sensors with built in single ended output amplifiers can be used. Also, single ended output could be designed to operate standard marine type gauges used with some present-day tank sensors. For better resolution a digital display device calibrated in units, e.g. gallons, or liquid depth could be used.

In aircraft and other applications an atmospheric sensor could be used to adjust the amplifier for changing atmospheric pressure levels.

In the additional embodiment the portable device could be of several different designs and still perform the same function. The embodiment as shown could have a partial enclosure and operator shield attached to the operator handle 27. It could also have a squeegee device around the hose to strip excess liquid as hose 30 returns to the spool 28. Otherwise, all the conclusions of the Preferred Embodiment would apply to the Additional Embodiment.

What is claimed is:

1. A liquid level measuring device that measures the pressure at the bottom of a tank consisting of:

A differential pressure sensor;

With one port exposed to atmosphere pressure;

And the other port exposed to the bottom of the tank;

Such that a change in liquid level within the tank causes a corresponding change in the pressure at the bottom of the tank wherein said pressure change is indicative of the liquid level;

Such that said differential pressure sensor is located outside the tank above the liquid level.

2. The liquid-level measuring device of claim 1, wherein it is a portable device.

* * * * *